(12) United States Patent
French et al.

(10) Patent No.: US 8,225,230 B2
(45) Date of Patent: Jul. 17, 2012

(54) PROVIDING A HIERARCHICAL FILTERED VIEW OF AN OBJECT MODEL AND ITS INTERDEPENDENCIES

(75) Inventors: Paul B. French, Cork (IE); Mark J. Lucas, Cork (IE); Kieran Moynihan, Cork (IE)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 12/233,993

(22) Filed: Sep. 19, 2008

(65) Prior Publication Data

US 2010/0077340 A1    Mar. 25, 2010

(51) Int. Cl.
G06F 3/048      (2006.01)
G06F 7/00       (2006.01)
G06F 17/30      (2006.01)

(52) U.S. Cl. .............................. 715/804; 707/766
(58) Field of Classification Search ............ 707/759, 707/765–768; 715/804
See application file for complete search history.

(56) References Cited

U.S. PATENT DOCUMENTS

| | | | | |
|---|---|---|---|---|
| 5,430,836 | A * | 7/1995 | Wolf et al. | 715/744 |
| 6,108,004 | A * | 8/2000 | Medl | 715/804 |
| 6,437,812 | B1 * | 8/2002 | Giles et al. | 715/853 |
| 6,539,367 | B1 * | 3/2003 | Blanksby et al. | 706/14 |
| 6,750,864 | B1 | 6/2004 | Anwar | |
| 6,995,768 | B2 | 2/2006 | Jou et al. | |
| 7,065,714 | B1 * | 6/2006 | Theel et al. | 715/781 |
| 7,188,317 | B1 * | 3/2007 | Hazel | 715/804 |
| 7,203,701 | B1 * | 4/2007 | Packebush et al. | 1/1 |
| 7,756,907 | B2 * | 7/2010 | Stolte et al. | 707/805 |
| 7,882,144 | B1 * | 2/2011 | Stolte et al. | 707/802 |
| 2003/0028370 | A1 * | 2/2003 | Leffert | 704/10 |
| 2003/0028551 | A1 * | 2/2003 | Sutherland | 707/200 |
| 2004/0230914 | A1 * | 11/2004 | Arend et al. | 715/804 |
| 2005/0039139 | A1 * | 2/2005 | Schwartz et al. | 715/804 |
| 2008/0163125 | A1 * | 7/2008 | Gu et al. | 715/853 |

OTHER PUBLICATIONS

Mehta et al., "A Hierarchy Navigation Framework: Supporting Scalable Interactive Exploration over Large Databases", Proceedings of the 9th International Database Engineering & Application Symposium (IDEAS'05). IEEE 2005. pp. 10.*
Stroe, "Scalable Visual Hierarchy Exploration", Worcester Polytechnic Institute, May 2000, pp. 95.*

(Continued)

*Primary Examiner* — Chat Do
*Assistant Examiner* — Ryan Barrett
(74) *Attorney, Agent, or Firm* — Cantor Colburn LLP; Jeff LaBaw

(57) ABSTRACT

Supporting a visualization of an object model in which multiple dependencies exist between each of a plurality of objects by limiting one or more object instances in the object model and filtering one or more attributes associated with one or more of the object instances. The limiting and filtering is performed by utilizing a plurality of windows, panels, or sub-windows to display a corresponding list of one or more objects for a dimension, along with one or more attributes associated with each of the one or more objects; and updating a second window, panel, or sub-window in response to receiving a selection of an item from a first window, panel, or sub-window according to a relationship defined in the object model, wherein the updating is performed in a hierarchical manner.

14 Claims, 9 Drawing Sheets

OTHER PUBLICATIONS

Hao et al., "Web-Based Visualization of Large Hierarchical Graphs Using Invisible Links in a Hyperbolic Space", Hewlett-Packard Company 2000, pp. 17.*

Sabol et al. Fused Exploration of Temporal Developments and Topical Relationships in Heterogeneous Data Sets. 1 lth International Conference Information Visualization (IV'07) 0-7695-2900-3/07.*

Ferreira de Oliveira et al. From Visual Data Exploration to Visual Data Mining: A Survey. IEEE Transactions on Visualization and Computer Graphics, vol. 9, No. 3, Jul.-Sep. 2003.*

Daniel A. Keim et al. Visualization Techniques for Mining Large Databases: A Comparison.IEEE Transactions on Knowledge and Data Engineering, vol. 8, No. 6, Dec. 1996 p. 923.*

Hee Yong Yoo et al. Visualizing Hierachical Information Using a new Focus+Context Method. Proceedings of the Fourth Annual ACIS International Conference on Computer and Information Science (ICIS'05). 0-7695-2296-3/05© 2005 IEEE.*

N. Elmqvist et al. DataMeadow: A Visual Canvas for Analysis of Large-Scale Multivariate Data, Information Visualization, Feb. 28, 2008, pp. 18-33, vol. 7, Palgrave MacMillian, Ltd.*

D. A. Keim, et al., VisDB: Database Exploration Using Multidimensional Visualization, IEEE Computer Graphics and Applications, Sep. 1994, pp. 40-49, Institute for Computer Science, University of Munich, Bericht 9413.

S.R. Dos Santos, A Framework for the Visualization of Multidimensional and Multivariate Data, Sep. 2004, The University of Leeds, School of Computing.

D. Seelow, et al., D-Matrix: Database Exploration, Visualization and Analysis, BMC Bioinformatics, Oct. 28, 2004, 5:168, BioMed Central, Ltd.

N. Elmqvist, et al., DataMeadow: A Visual Canvas for Analysis of Large-Scale Multivariate Data, Information Visualization, Feb. 28, 2008, pp. 18-33, vol. 7, Palgrave MacMillan, Ltd.

* cited by examiner

PROVIDING A HIERARCHICAL FILTERED VIEW OF AN OBJECT MODEL AND ITS INTERDEPENDENCIES

BACKGROUND

This invention relates to the field of computing and, in particular, to methods, computer program products, and hardware products for supporting a visualization of an object model in which multiple dependencies exist between each of a plurality of objects.

In a system with an object model in which multiple dependencies exist between objects, it is difficult to provide a visualization mechanism for a single filtered display of the instances and attributes of that model. For example, FIG. 1 sets forth an illustrative prior art multidimensional model. A first dimension, shown as dimension A 101, represents a plurality of customers. Dimension A 101 includes one or more attributes denoted as $a_1$-$a_i$. If only one attribute is employed, it is denoted as $a_1$, whereas if one or more attributes are employed in addition to $a_1$, they are denoted as $a_i$ where i represents a positive integer greater than one. Each of the plurality of customers subscribes to one or more services represented by a second dimension, dimension B 103. Dimension B 103 includes one or more attributes denoted as b1-bj. If only one attribute is employed, it is denoted as $b_1$, whereas if one or more attributes are employed in addition to $b_1$, they are denoted as $b_j$ where j represents a positive integer greater than one.

Each of the plurality of services is implemented by one or more networks or network elements represented by a third dimension, dimension C 105. Dimension C 103 includes one or more attributes denoted as $c_1$-$c_k$. If only one attribute is employed, it is denoted as $c_1$, whereas if one or more attributes are employed in addition to $c_1$, they are denoted as $c_k$ where k represents a positive integer greater than one. Each of the plurality of networks or network elements is supported by one or more devices represented by a fourth dimension, dimension D 107. Dimension D 107 includes one or more attributes denoted as $d_1$-$d_h$. If only one attribute is employed, it is denoted as $d_1$, whereas if one or more attributes are employed in addition to $d_1$, they are denoted as $d_h$ where h represents a positive integer greater than one. Each of the plurality of devices is used by one or more customers represented by the first dimension, dimension A 101.

Considering the multidimensional model of FIG. 1, it is apparent that there is a high cardinality of both object instances and inter-dependencies of models. Unfortunately, existing object models do not provide any mechanism by which a user can obtain a filtered display of related objects and their attributes to allow navigation between such objects. For example, presently existing object models do not provide a consolidated view of Operational Support System (OSS) data in a fixed mobile converged telecommunications service assurance environment. Rather, current OSS's for use in service assurance environments are stove-piped, such that the OSS's only examine one or more data sets associated with the network, the customer, services, or devices. However, many different OSS systems are required for service management, such as Network Fault Management, Network Performance Management (PM), Network Inventory Systems, Service Inventory, Service Quality Management (SQM), Service Level Management (SLM), Customer Experience Management (CEM), Device Management Systems, and Customer Relationship Management (CRM). Relating information between these systems is a manual process and subject to error. Errors are attributable to different naming schemes for objects, incomplete coverage, duplication, as well as a variety of other causes.

SUMMARY

A method supports a visualization of an object model in which multiple dependencies exist between each of a plurality of objects by limiting one or more object instances in the object model and filtering one or more attributes associated with one or more of the object instances. The limiting and filtering is performed by utilizing each of a plurality of respective windows, panels, or sub-windows to display a corresponding list of one or more objects for a dimension of a plurality of dimensions, along with one or more attributes associated with each of the one or more objects. At least a second window, panel, or sub-window of the plurality of respective windows, panels, or sub-windows is updated in response to receiving a selection of an item from a first window, panel, or sub-window of the plurality of respective window, panels, or sub-windows according to a first relationship defined in the object model. The updating is performed in a hierarchical manner wherein at least a third window, panel, or sub-window of the plurality of respective windows, panels, or sub-windows is updated in response to receiving a selection of an item from the second window, panel, or sub-window according to a second relationship defined in the object model. A filtering procedure is performed across the plurality of dimensions to restrict one or more instances of the one or more objects to be displayed in the plurality of respective windows, panels, or sub-windows to thereby control and manage the visualization of the object model wherein the object model provides a high cardinality of objects.

Computer program products and hardware products corresponding to the above-summarized methods are also described and claimed herein. Other methods, hardware products, and/or computer program products according to embodiments will be or become apparent to one with skill in the art upon review of the following drawings and detailed description. It is intended that all such additional methods, hardware products, and/or computer program products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Figure 2:
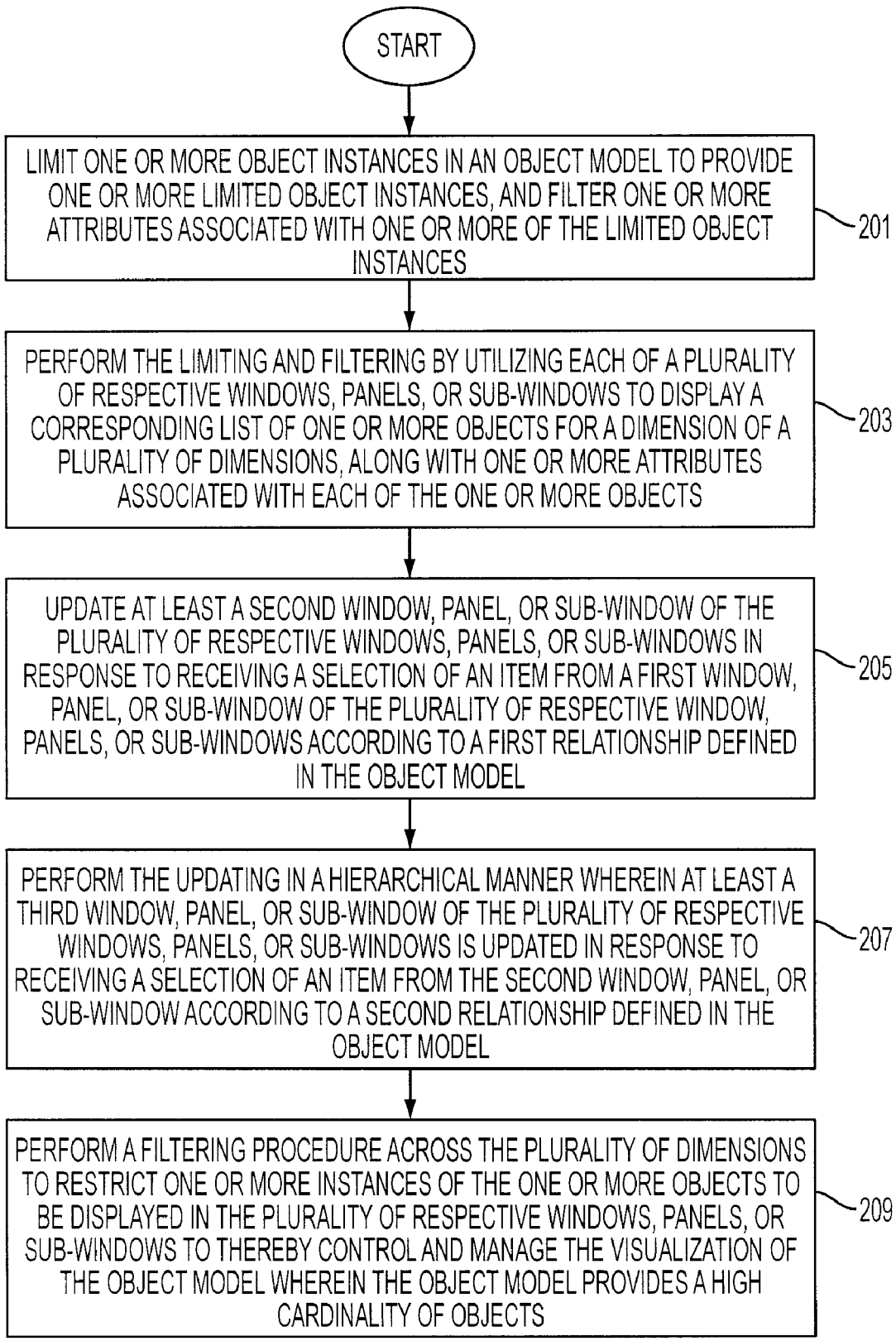
FIG. 2 is a flowchart setting forth a first illustrative operational sequence for supporting a visualization of an object model in which multiple dependencies exist between each of a plurality of objects.

FIG. 2 is a flowchart setting forth an illustrative operational sequence for supporting a visualization of an object model in which multiple dependencies exist between each of a plurality of objects. The operational sequence of FIG. 2 commences at block 201 where one or more object instances in the object model are limited to provide one or more limited object instances, and one or more attributes associated with one or more of the limited object instances are filtered. At block 203, the limiting and filtering is performed by utilizing each of a plurality of respective windows, panels, or sub-windows to display a corresponding list of one or more objects for a dimension of a plurality of dimensions, along with one or more attributes associated with each of the one or more objects. Next, at block 205, at least a second window, panel, or sub-window of the plurality of respective windows, panels, or sub-windows is updated in response to receiving a selection of an item from a first window, panel, or sub-window of the plurality of respective window, panels, or sub-windows according to a first relationship defined in the object model.

At block 207, the updating is performed in a hierarchical manner wherein at least a third window, panel, or sub-window of the plurality of respective windows, panels, or sub-windows is updated in response to receiving a selection of an item from the second window, panel, or sub-window according to a second relationship defined in the object model. Then, at block 209, a filtering procedure is performed across the plurality of dimensions to restrict one or more instances of the one or more objects to be displayed in the plurality of respective windows, panels, or sub-windows to thereby control and manage the visualization of the object model wherein the object model provides a high cardinality of objects.

Figure 3:
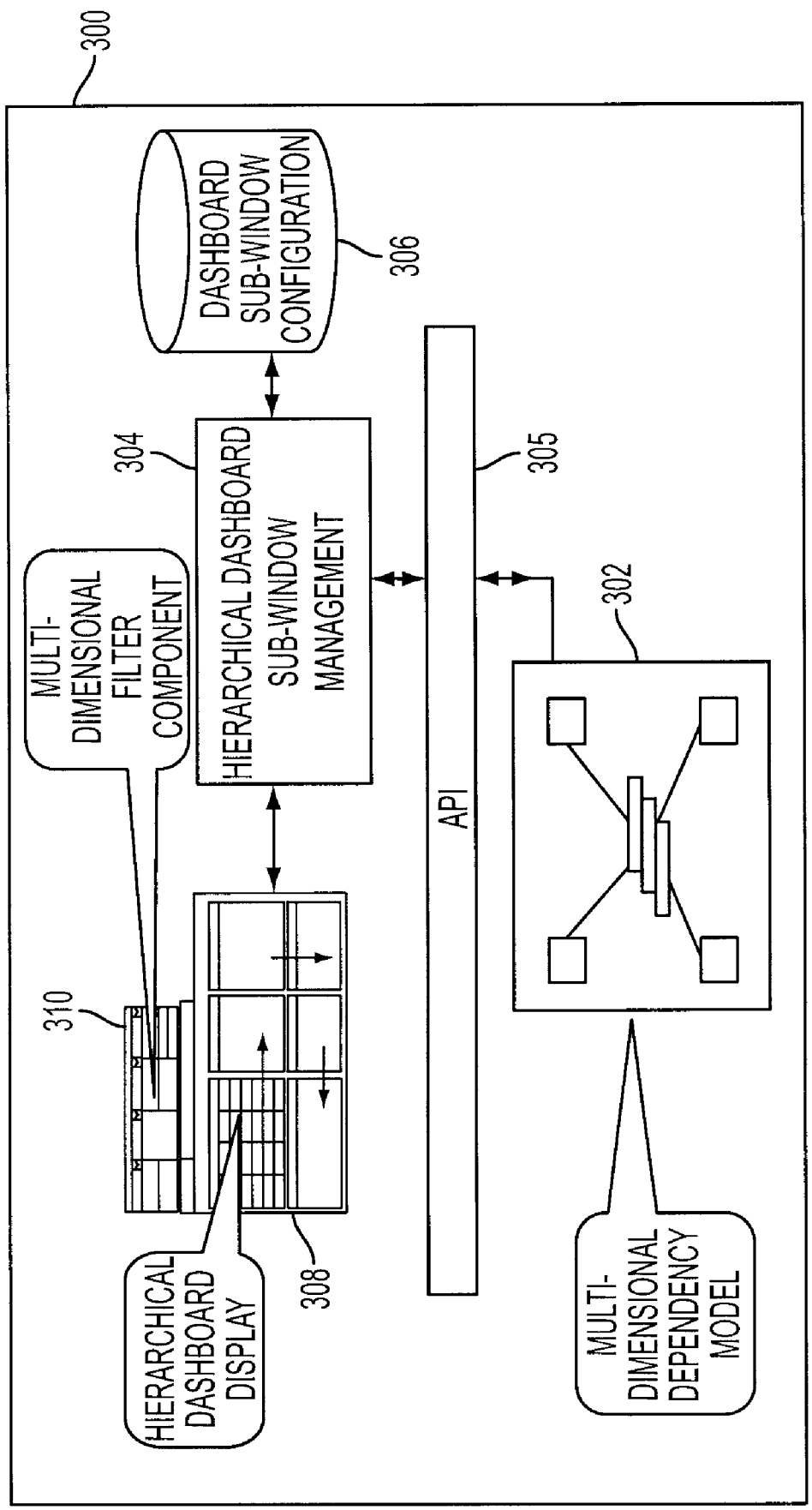
FIG. 3 is a block diagram of an illustrative hierarchical filtered dashboard system for use with the procedure of FIG. 2.

Consider an illustrative hierarchical filtered dashboard system 300 as shown in FIG. 3. The dashboard system 300 includes a multi-dimensional dependency model 302 operatively coupled to an application program interface (API) 305. A hierarchical dashboard sub-window management system 304 is operatively coupled to the API 305. The hierarchical dashboard sub-window management system 304 is in communication with a dashboard sub-window configuration 306. A hierarchical dashboard display 308, operatively coupled to the hierarchical dashboard sub-window management system 304, includes a multi-dimensional filter component 310.

The multi-dimensional dependency model 302 provides information for driving the hierarchical dashboard display 308. The multi-dimensional dependency model 302 itself (and the API 305 to the model) provides the abilities to: (a) query related instances of one object with others in a dependency chain, and (b) query a value of attributes for objects in the dependency chain.

Figure 4:
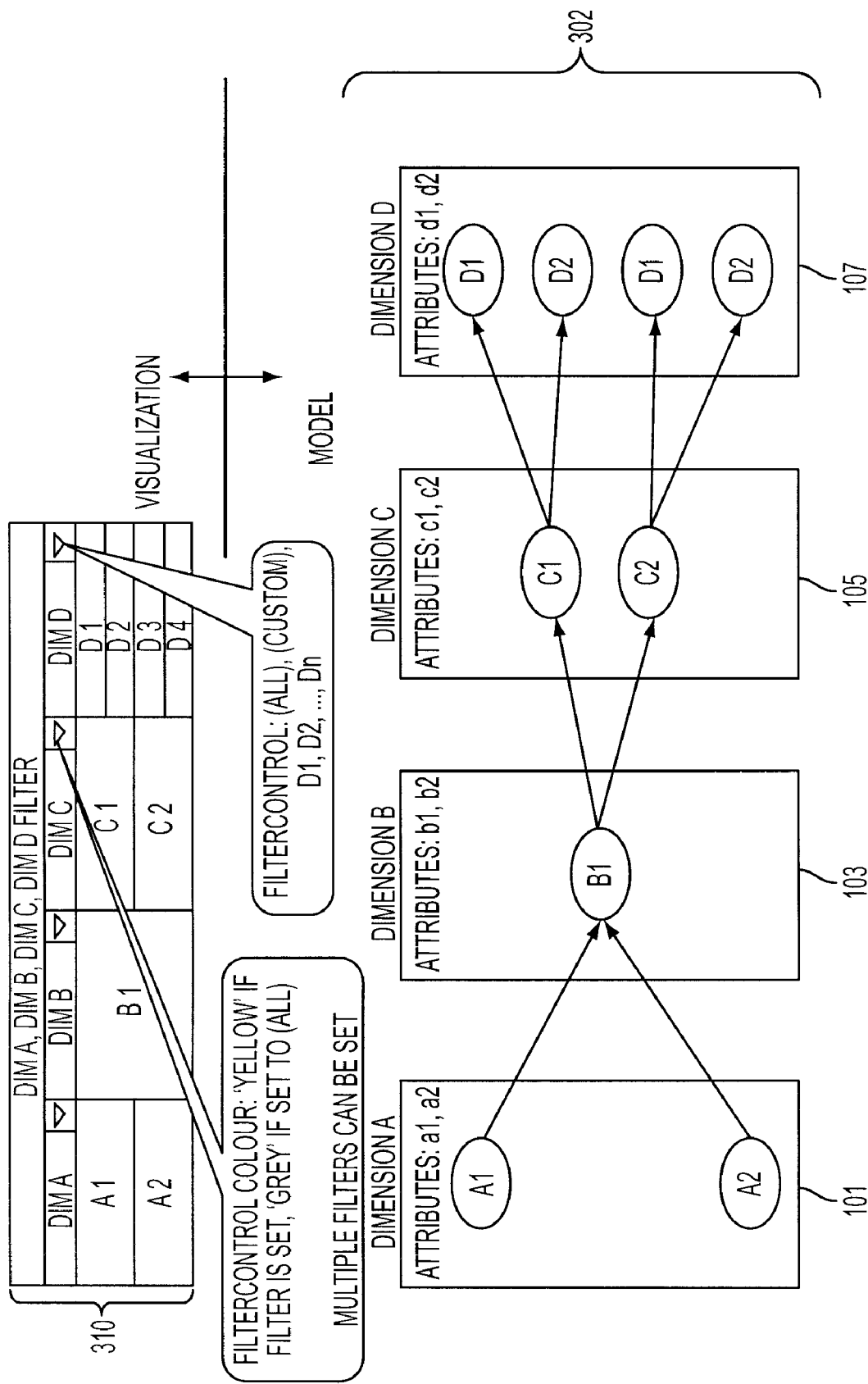
FIG. 4 is a block diagram of an illustrative multi-dimensional dependency model for use with the hierarchical filtered dashboard system of FIG. 3.

FIG. 4 is a block diagram of an illustrative multi-dimensional dependency model 302 (FIGS. 3 and 4) for use with the hierarchical filtered dashboard system 300 of FIG. 3. The multi-dimensional filter component 310 (FIGS. 3 and 4) allows a user to filter one or more instances of related objects to be displayed. The multi-dimensional filter component 310 takes into account one or more relationships between objects. This filter is used by the hierarchical filtered dashboard system 300 to limit one or more object instances that are displayed in each of a plurality of sub-windows (to be described in greater detail hereinafter with reference to FIG. 5) by the multidimensional filter component 310.

Figure 1:
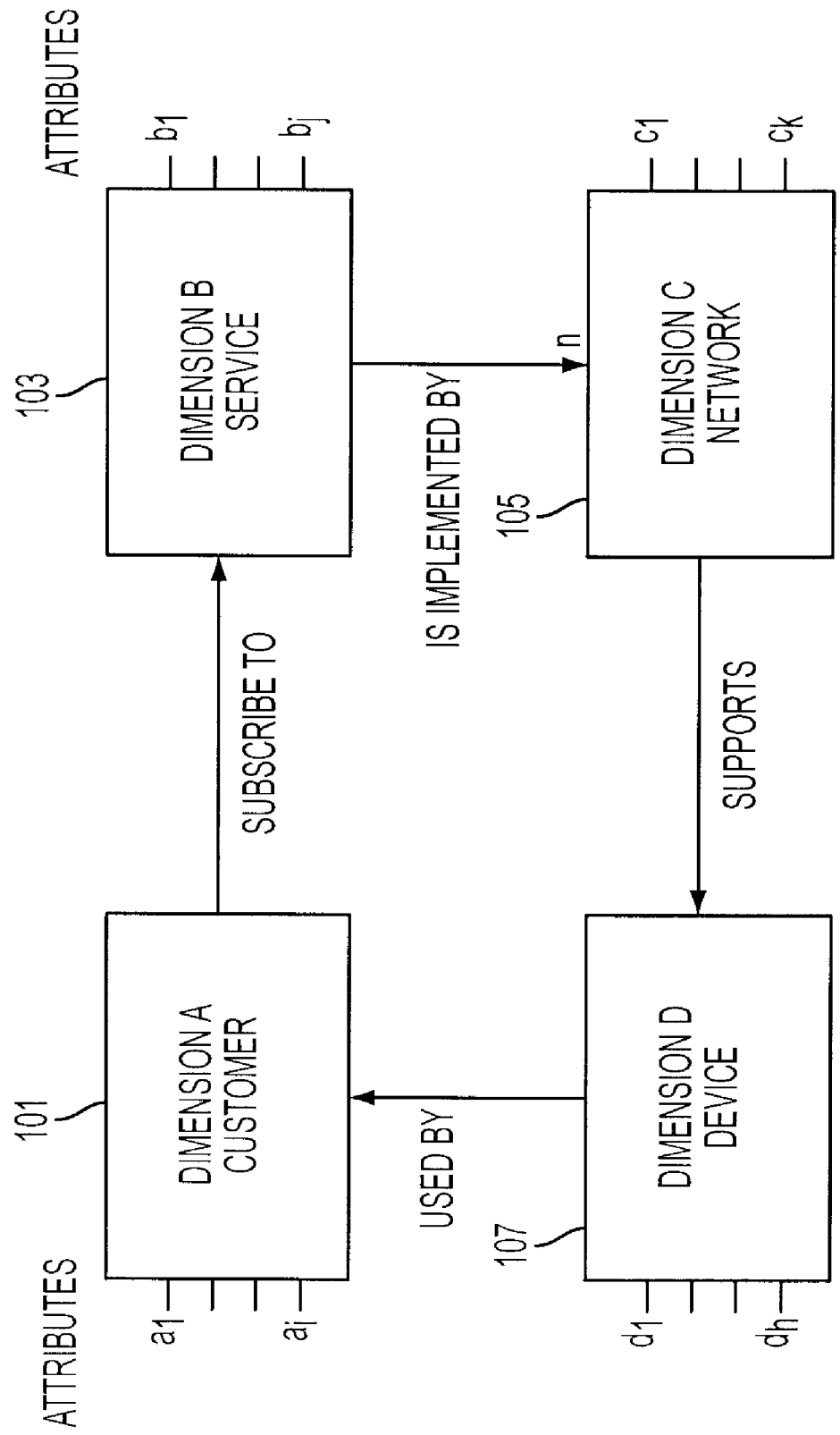
FIG. 1 is a block diagram setting forth an illustrative prior art multidimensional model in which multiple dependencies exist between each of a plurality of objects.
Figure 5:
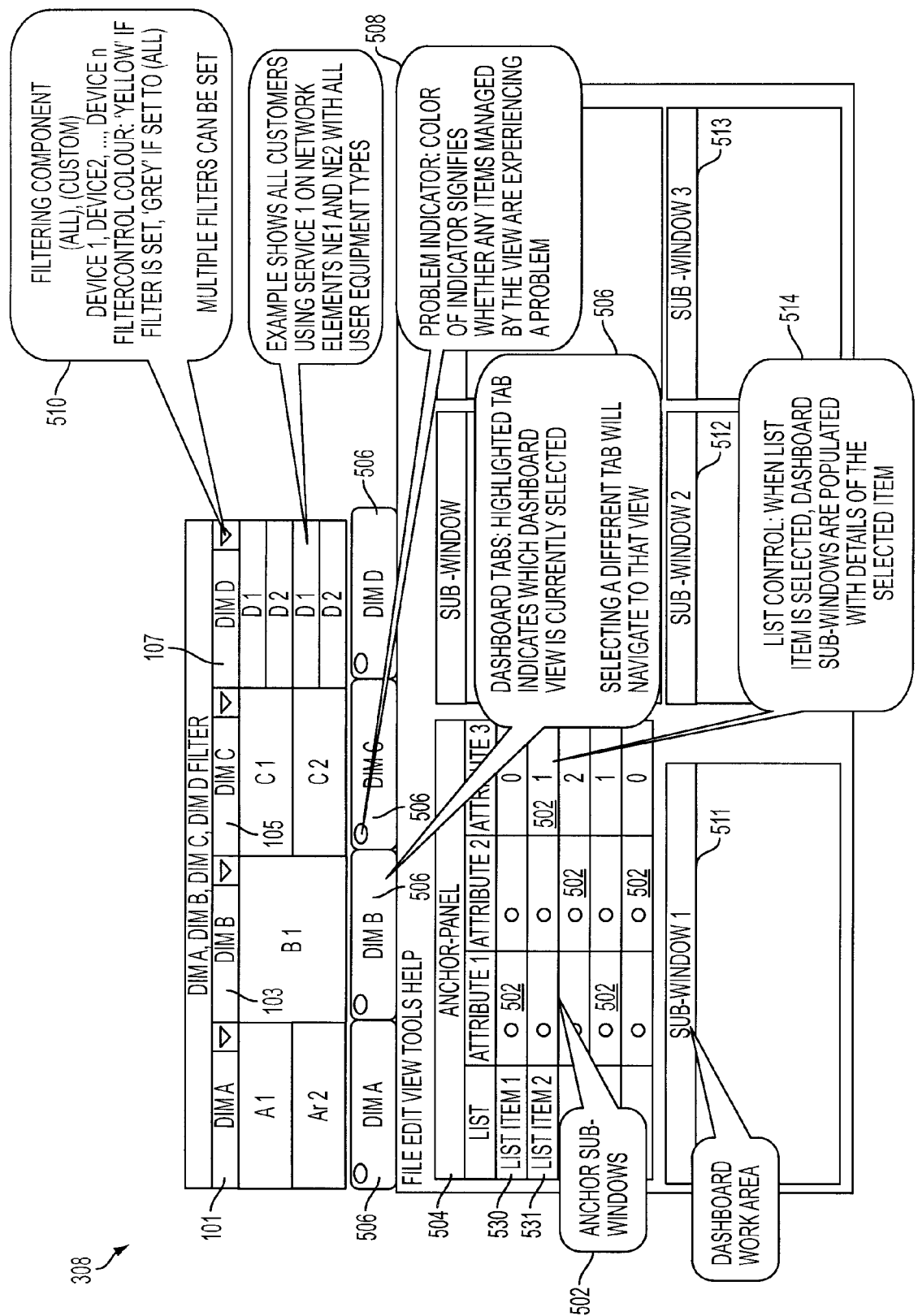
FIG. 5 is a diagram of an illustrative hierarchical dashboard display prepared using the method of FIG. 2.

FIG. 5 is a diagram of an illustrative hierarchical dashboard display 308 prepared using the method of FIG. 2. The hierarchical dashboard display 308 includes a plurality of sub-windows such as a first sub-window designated as sub-window 1 511, a second sub-window designated as sub-window 2 512, and a third sub-window designated as sub-window 3 513. At least one of sub-window 1 511, sub-window 2 512, or sub-window 3 513 display related objects and attributes for one or more dimensions such as Dimension A 101 (FIGS. 1 and 5)—Customers, Dimension B 103—Services, Dimension C 105—Network and Dimension D 107—Devices. There are two types of sub-windows: anchor sub-windows 502 (FIG. 5) accessed from an anchor panel 504, and subordinate sub-windows, examples of which are sub-window 1 511, sub-window 2 512, and sub-window 3 513 (to be described hereinafter with reference to FIG. 6) that are accessed from the anchor sub-windows 502. Anchor panel 504 is controlled by a list control 514 mechanism. List control 514 operates such that, when a list item is selected, at least one of sub-window 1 511, sub-window 2 512, or sub-window 3 513 are populated with details of an item selected from the anchor panel 504.

The hierarchical dashboard display (FIG. 5) includes a plurality of dashboard tabs 506. Each respective dashboard tab of dashboard tabs 506 launches a corresponding dashboard. The corresponding dashboard may, but need not, correspond with one or more of the dimensions described previously in conjunction with FIG. 1, such as Dimension A 101—Customer, Dimension B 103—Service, Dimension C 105—Network, and Dimension C 107—Device. Thus, if dashboard tabs 506 are to be used in an illustrative environment of a fixed mobile converged service assurance telecommunications system, these dashboard tabs 506 may include a first tab labeled "Customer", a second tab labeled "Service", a third tab labeled "Network", and a fourth tab labeled "Device", along with an optional performance management (PM) tab.

The hierarchical dashboard display 308 includes a plurality of respective problem indicators 508 each associated with a corresponding dashboard tab of dashboard tabs 506. Illustratively, a respective problem indicator of problem indicators 508 is displayed in a color that is indicative of whether a corresponding dashboard tab of dashboard tabs 506 is experiencing any problem. The hierarchical dashboard display 308 also includes a filtering component 510. The filtering component 510 implements a filtering process on related instance data.

Figure 6:
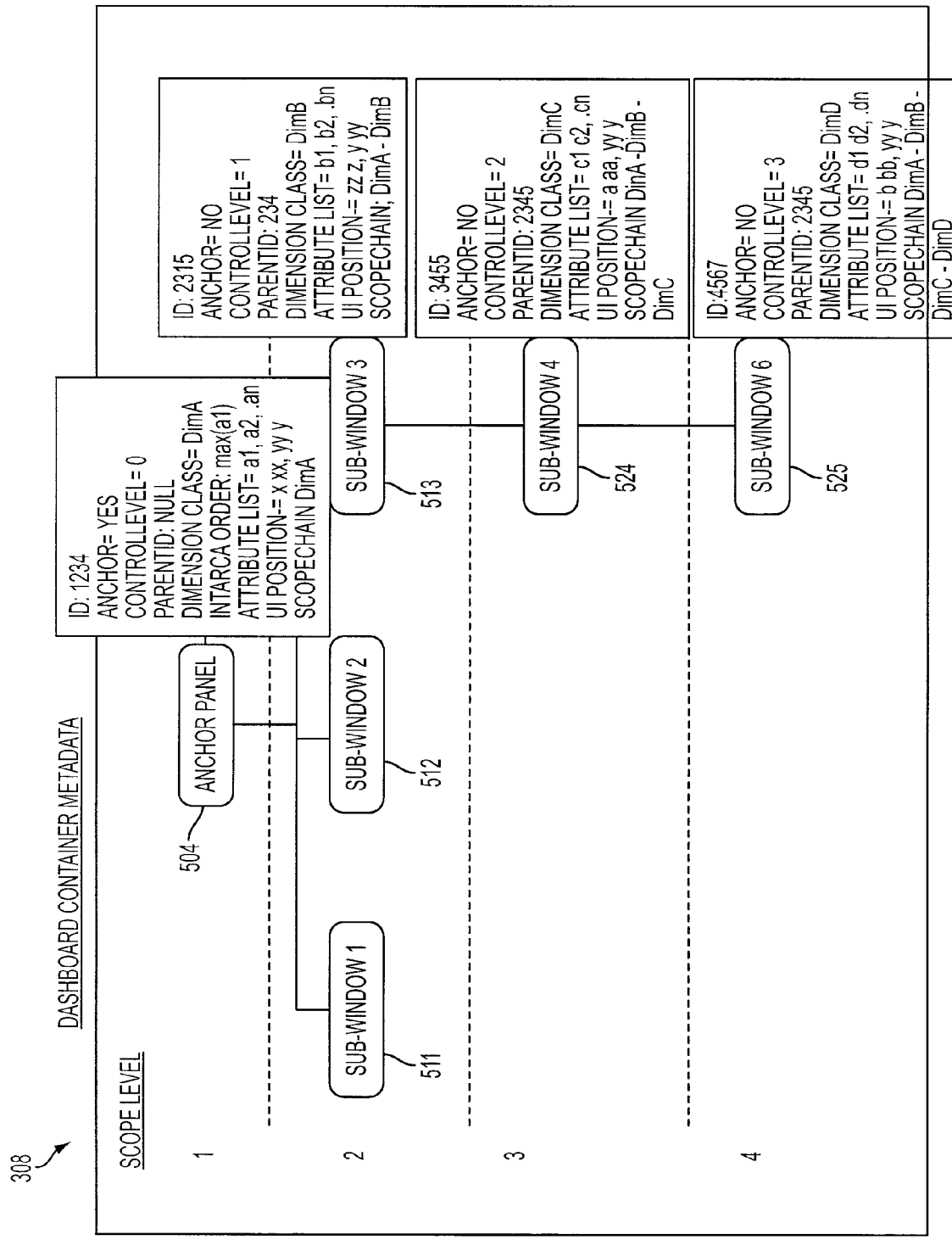
FIG. 6 is a diagram showing exemplary metadata for defining hierarchical dashboard displays.

FIG. 6 is a diagram showing exemplary metadata for defining hierarchical dashboard displays. More specifically, FIG. 6 shows an illustrative set of sub-windows that are displayed in the hierarchical dashboard display 308 of FIG. 5. As previously discussed, there are two types of sub-windows. A first type of sub-window is the anchor panel 504. A second type of sub-window includes subordinate sub-windows such as sub-window 1 511 (FIGS. 5 and 6), sub-window 2 512, sub-window 3 513, sub-window 4 524, and sub-window 6 525. The anchor panel 504 (FIGS. 5 and 6) is a sub-window, illustratively at the top left corner of the hierarchical dashboard display 308 (FIG. 5), that may be conceptualized as the driving window of the dashboard display and containing data which is the primary focus of the dashboard display. Selection of a row in the anchor panel 504 (FIGS. 5 and 6) sub-window, such as a first row 530 (FIG. 5) or a second row 531 (FIG. 5) causes what is displayed in (some or all) subordinate sub-windows to update accordingly.

As indicated previously, the dashboard display 308 (FIG. 5) may contain one or more subordinate sub-windows such as sub-window 1 511 (FIGS. 5 and 6), sub-window 2 512, sub-window 3 513, sub-window 4 524, and sub-window 6 525. Selection of one or more rows 530, 531 (FIG. 5) in the anchor panel 504 sub-window causes the data in other sub-windows to update. The list of subordinate sub-windows which get triggered to update themselves when the selection of the anchor panel 504 (i.e., parent window) changes is termed the 'scope of control' of the parent window. This scope of control is hierarchical. This means that a parent window has scope of control over sub-windows at the next level of scope, which in turn can have scope of control over other sub-windows in a hierarchical manner (i.e. no overlap).

For example, the dashboard display 308 of FIG. 6 contains anchor panel 504 and 6 sub-windows. The dashboard may be configured to have sub-window 1 511, sub-window 2 512, and sub-window 3 513 change when the anchor panel 504 changes. However, sub-window 4 524 is triggered to update only when sub-window 3 513 is changed, and sub-window 6 525 is triggered to updated only when sub-window 4 524 is updated.

Figure 7:
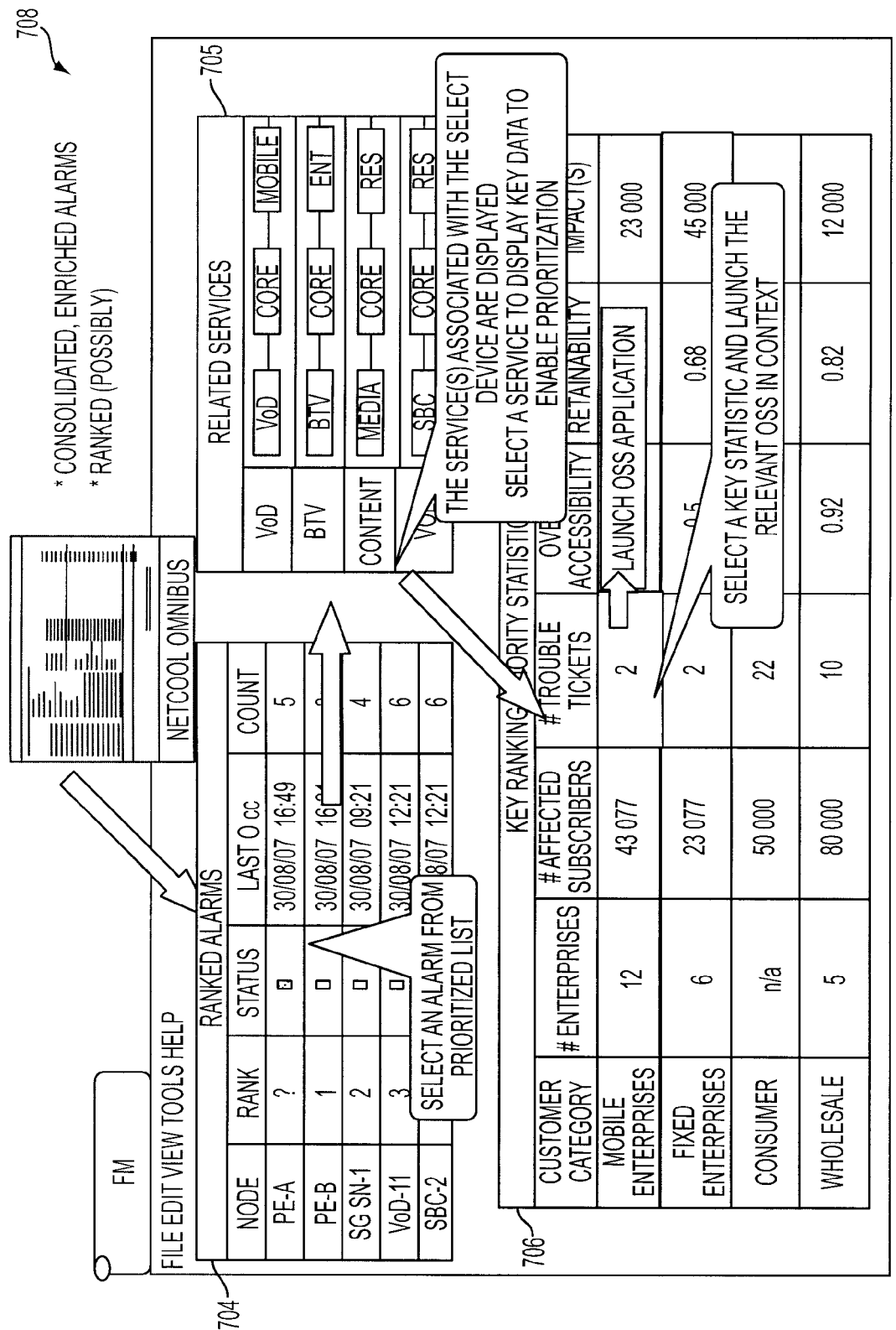
FIG. 7 shows an illustrative hierarchical dashboard display constructed using the method of FIG. 2.

FIG. 7 shows an illustrative dashboard display 708 constructed using the method of FIG. 2. The sample dashboard display 708 is constructed such that an anchor panel called Ranked Alarms 704 affects a first sub-window called Related Services 705. The Related Services 705 sub-window, in turn, affects a second sub-window called Key Ranking/Priority Statistics 706. Attributes for one or more objects in the anchor panel, or the sub-windows, or the anchor panel and the sub-windows, are displayed. The specification of what attributes are displayed for each object class/dimension are part of a configuration for the dashboard sub-window.

Dashboard tabs 506 (FIG. 5) are graphical user interface elements that are used to launch different dashboards. Filtering component 510 controls the hierarchical dashboard display 308. The hierarchical filtered dashboard display 308 maintains a mapping between related instances. The nature of these relationships is system-specific. However, in summary: The cardinality of these relationships may be high. Some relationships will be one-to-one (e.g. one Customer Premise Equipment [CPE] is owned by one Customer). Some relationships will be one-to-many (e.g. more than one service can run over the same network segment, the same device can be used to access more than one service, etc.). Some relationships will be many-to-many (e.g. many Customers will subscribe to many services). Therefore, a common mechanism is provided that can be used for all dashboards to filter what object instances will be displayed in each dashboard display 308 and in each sub-window or anchor panel 504. Note that the purpose of the filtering component 510 is to limit instances, not the information (attributes) of instances. Filtering what information (about each instance) is displayed may be the purpose of a different type of filter.

Figure 8:
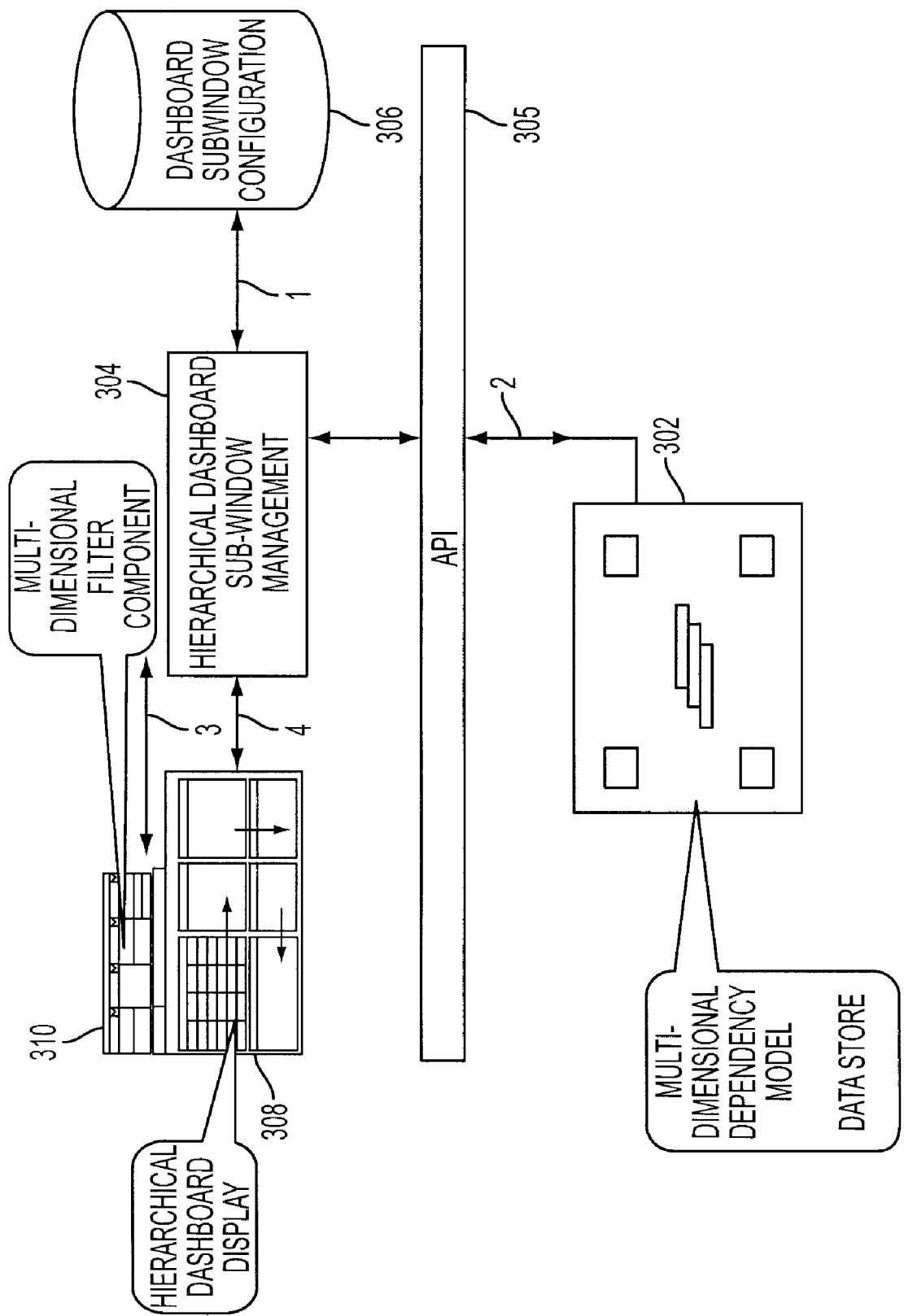
FIG. 8 is a flowchart setting forth a second illustrative operational sequence for supporting a visualization of an object model in which multiple dependencies exist between each of a plurality of objects.

FIG. 8 is a flowchart setting forth a second illustrative operational sequence for supporting a visualization of an object model in which multiple dependencies exist between each of a plurality of objects. Basically, FIG. 8 describes the operational sequence that is executed when a user elects to display a hierarchical dashboard such as the dashboard display 308 of FIG. 5. The operational sequence of FIG. 8 commences at step 1 where the hierarchical dashboard sub-window management 304 (FIGS. 3 and 8) system reads dashboard metadata from metadata stored in the dashboard sub-window configuration 306 database. This metadata includes a definition of the dashboard display 308 (FIG. 5) and its chained relationships between sub-windows. The dashboard display 308, anchor panel 504, sub-windows 511, 512, 513 and their associated metadata are illustrated in FIG. 5. Some key (but not exhaustive) attributes of a sub-window metadata are:

ID: A globally unique identifier for the sub-window.

Anchor Panel (Y/N). This indicates whether or not a sub-window 511, 512, 513 is in an anchor panel 504 or not. There can only be one anchor panel 504 in a hierarchical dashboard display 308.

Scope Level: This is level of the sub-window 511, 512, 513 within a window hierarchy. Level 0 is the anchor panel 504. Level 1 are those sub-windows 511, 512, 513 directly dependent on the anchor panel 504. Level 2 are those sub-windows 524, 525 (FIG. 6) directly dependent on the Level 1 sub-windows 511, 512, 513 (FIGS. 5 and 6).

Scope Chain: This is the class chain from the anchor panel 504 (FIG. 5) to a particular sub-window 511, e.g. DimA-DimB. It is used to scope the object instances to be displayed in the sub-window.

Parent ID: Identifier of a parent sub-window which qualifies this sub-window.

Dimension/Class: Instances of one class are displayed in a sub-window. This is the Class identifier.

Instance Order: This specifies the order in which instances of the class are displayed. It is an expression-based mechanism used to provide a unique list, e.g. maximum value of a particular attribute, etc.

Attribute List: This is the list of attribute identifiers of the Class defined above to be displayed in a sub-window 511, 512, 513.

UI Attributes: The position, widgets, etc to be used to display the instances and attributes.

Data Store Query Mechanism: This information will allow a client construct an appropriate query to a multi-dimensional dependency model 302 (FIGS. 3 and 8) data store.

Returning to FIG. 8, at step 2, the hierarchical dashboard sub-window management 304 system (FIG. 3) reads ALL the object instances and attributes as specified in the metadata for the anchor panel 504 (FIG. 5) from the multi-dimensional dependency model 302 (FIGS. 3 and 8) data store. The hierarchical dashboard sub-window management 304 system uses the Data Store Query Mechanism metadata to construct a query API for API 305.

Next, at step 3 (FIG. 8), a filtering algorithm is performed. The hierarchical dashboard sub-window management 304 (FIGS. 3 and 8) reads filter information from the multi-dimensional filter component 310 (FIGS. 3 and 8). This information is used to filter the instances of the objects of all dimension classes in the anchor window 504 (FIG. 5) and sub-windows 511, 512, 513 which may be a subset of that retrieved from the multi-dimensional dependency model 302 data store (FIGS. 3 and 8).

The operational sequence of FIG. 8 progresses to step 4 where the hierarchical dashboard sub-window management 304 system (FIGS. 3 and 8) renders the dashboards using the following algorithm: First, dashboard container metadata is read. This metadata contains the metadata for the dashboard itself and all its sub-windows 511, 512, 513 (FIG. 5) including the anchor panel 504. The algorithm then renders the dashboard container and standard widgets (File, Edit, View, etc.). Second, display the anchor panel sub-window in a location using a visualization mechanism defined in the metadata. The instances of the classes specified in the anchor panel 504 metadata that are displayed are limited by the filter specified in the multi-dimensional filter component 310 (FIGS. 3 and 8). Third, the order in which the instances are displayed use the "Instance Order" metadata of the anchor panel 504 (FIG. 5). This could, for example, be the highest value of an attribute, e.g. max(Rank). Fourth, the first row 530 of the anchor panel 504 is highlighted. This provides the qualifier for instances to be displayed in sub-windows 511, 512, 513 of the next Scope Level, e.g. Scope Level 2.

Next, the following algorithm is performed on every sub-window whose parent window is the Anchor Panel: (a) The hierarchical dashboard sub-window management 304 system (FIGS. 3 and 8) reads ALL the object instances and attributes as specified in the metadata for the sub-window from the multi-dimensional dependency model 302 data store, qualified by the relationship to the selected instance of the anchor panel 504 (FIG. 5) and the filter. The hierarchical dashboard sub-window management 304 system (FIGS. 3 and 8) uses the data store query mechanism metadata to construct the query API for API 305. An example of this query (not exact SQL but more for clarification purposes) is as follows: (Assume Anchor Panel Class is DimA and Subwindow Class is DimB with attributes b1, b2 and b3. Also assume that selected instance in Anchor Panel is 'A1':

SELECT ID, b1, b2, b3 from DimB
WHERE ScopeChain='A1'

Translated, the foregoing expressions mean "Select instance Identifier, Attributes b1, b2 and b3 from DimB instances where the scoped chain relationship between DimA and DimB matches instance 'A1'. (b) Once it has retrieved all this data, the hierarchical dashboard sub-window management 304 again filters this list using the filter set in the Multi-Dimensional Filter Component. In essence, all the instances in the sub-window are in scope in this case because they are all related to the instance selected in the anchor window 504 (FIG. 5). The UI should somehow highlight the chain between the anchor window 504 and the sub-window 511, 512, or 513. Because of the potential complexity of the inter-relationships between objects, the Scope Chain concept and the UI artifacts used to highlight the scope chain in the UI allow a user to understand the context of what is being displayed. A row in the sub-window 513 may then be highlighted which, in turn, may cause one or more sub-windows 524, 525 (FIG. 6) in the next level to populate.

The foregoing mechanism is repeated for sub-windows at all subsequent levels in the chain in a recursive manner. For example, assume instance 'A1' was selected in the anchor window 504 (FIG. 5); instance 'B1' was selected in a Level 1 sub-window 513, then the scoped query to populate subwindow of Class DimC is something like:

SELECT ID, c1, c2, c3 from DimC
WHERE ScopeChain='A1-B1'

Translated, the foregoing expression means "Select instance Identifier, Attributes c1, c2 and c3 from DimC instances where the relationship chain between DimA and DimB is 'A1-B1'

Figure 9:
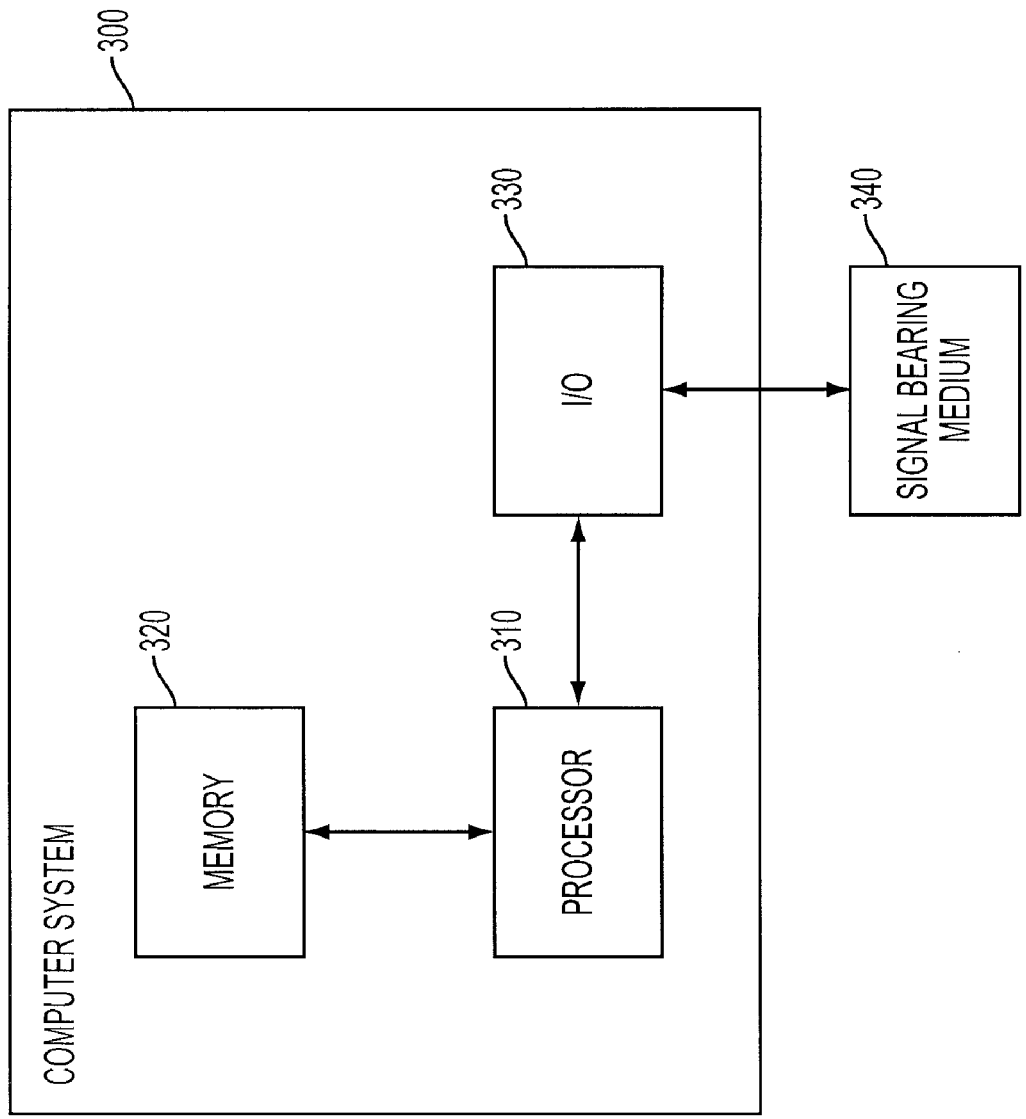
FIG. 9 is a block diagram setting forth an illustrative computer program product or hardware product for supporting a visualization of an object model in which multiple dependencies exist between each of a plurality of objects.

FIG. 9 is a block diagram setting forth an illustrative computer program product or hardware product for supporting a visualization of an object model in which multiple dependencies exist between each of a plurality of objects. The system includes a computer 300 operatively coupled to a signal bearing medium 340 via an input/output interface (I/O) 330. The signal bearing medium 340 may include a representation of instructions for supporting a visualization of an object model in which multiple dependencies exist between each of a plurality of objects, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes information for supporting a visualization of an object model in which multiple dependencies exist between each of a plurality of objects, wherein the information is represented, e.g., on the signal bearing medium 340 and communicated to the computer 300 via the I/O 330, wherein the processor 310 saves information as appropriate into a memory 320. This information may also be saved into the memory 320, e.g., via communication with the I/O 330 and the signal bearing medium 340.

The processor 310 executes a program comprising instructions for supporting a visualization of an object model in which multiple dependencies exist between each of a plurality of objects by limiting one or more object instances in the object model and filtering one or more attributes associated with one or more of the object instances. The limiting and filtering is performed by utilizing each of a plurality of respective windows, panels, or sub-windows to display a corresponding list of one or more objects for a dimension of a plurality of dimensions, along with one or more attributes associated with each of the one or more objects. At least a second window, panel, or sub-window of the plurality of respective windows, panels, or sub-windows is updated in response to receiving a selection of an item from a first window, panel, or sub-window of the plurality of respective windows, panels, or sub-windows according to a first relationship defined in the object model. The updating is performed in a hierarchical manner wherein at least a third window, panel, or sub-window of the plurality of respective windows, panels, or sub-windows is updated in response to receiving a selection of an item from the second window, panel, or sub-window according to a second relationship defined in the object model. A filtering procedure is performed across the plurality of dimensions to restrict one or more instances of the one or more objects to be displayed in the plurality of respective windows, panels, or sub-windows to thereby control and manage the visualization of the object model wherein the object model provides a high cardinality of objects. The foregoing steps may be implemented as a program or sequence of instructions within the memory 320, or on a signal bearing medium, such as the medium 340, and executed by the processor 310.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention The foregoing exemplary embodiments may be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments execute specific microprocessor machine instructions. The computer program code could be implemented using electronic logic circuits or a microchip.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-executable method for supporting a visualization of an object model, the method comprising:
   limiting one or more object instances in the object model, where multiple dependencies exist between each of the plurality of objects and filtering one or more attributes associated with one or more of the object instances, wherein the limiting and filtering is performed by:
   utilizing each of a plurality of respective windows, panels, or sub-windows to display a corresponding list of one or more objects for a dimension of a plurality of dimensions, along with one or more attributes associated with each of the one or more objects;
   updating at least a second window, panel, or sub-window of the plurality of respective windows, panels, or sub-windows in response to receiving a selection of an item from a first window, panel, or sub-window of the plurality of respective window, panels, or sub-windows according to a first relationship defined in the object model, wherein the updating is performed in a hierarchical manner such that at least a third window, panel, or sub-window of the plurality of respective windows, panels, or sub-windows is updated in response to receiving a selection of an item from the second window, panel, or sub-window according to a second relationship defined in the object model;
   performing a filtering procedure across the plurality of dimensions to restrict one or more instances of the one or more objects to be displayed in the plurality of respective windows, panels, or sub-windows to thereby control and manage the visualization of the object model wherein the object model provides a high cardinality of objects;
   displaying the first, second, and third windows, panels, or sub-windows on a hierarchical dashboard display; and
   generating the hierarchical dashboard display using a multi-dimensional dependency model operatively coupled to an application program interface (API), a hierarchical dashboard sub-window management system operatively coupled to the API, and a dashboard sub-window configuration database in communication with the hierarchical dashboard sub-window management system, wherein the hierarchical dashboard sub-window management system is operatively coupled to the hierarchical dashboard display.

2. The method of claim 1 further comprising providing the hierarchical dashboard display with a multi-dimensional filter component.

3. The method of claim 2 further comprising the multi-dimensional dependency model providing information for driving the hierarchical dashboard display.

4. The method of claim 3 further comprising using the multi-dimensional dependency model to query related instances of a first object with a plurality of other objects in a dependency chain.

5. The method of claim 4 further comprising using the multi-dimensional dependency model to query a value of attributes for the other objects in the dependency chain.

6. A computer program product comprising a non-transitory storage medium readable by a processing circuit and storing instructions for execution by the processing circuit for facilitating a method for supporting a visualization of an object model, the method comprising:
   limiting one or more object instances in the object model, where multiple dependencies exist between each of the plurality of objects and filtering one or more attributes associated with one or more of the object instances, wherein the limiting and filtering is performed by:
   utilizing each of a plurality of respective windows, panels, or sub-windows to display a corresponding list of one or more objects for a dimension of a plurality of dimensions, along with one or more attributes associated with each of the one or more objects;

updating at least a second window, panel, or sub-window of the plurality of respective windows, panels, or sub-windows in response to receiving a selection of an item from a first window, panel, or sub-window of the plurality of respective window, panels, or sub-windows according to a first relationship defined in the object model, wherein the updating is performed in a hierarchical manner such that at least a third window, panel, or sub-window of the plurality of respective windows, panels, or sub-windows is updated in response to receiving a selection of an item from the second window, panel, or sub-window according to a second relationship defined in the object model;

performing a filtering procedure across the plurality of dimensions to restrict one or more instances of the one or more objects to be displayed in the plurality of respective windows, panels, or sub-windows to thereby control and manage the visualization of the object model wherein the object model provides a high cardinality of objects;

displaying the first, second, and third windows, panels, or sub-windows on a hierarchical dashboard display; and generating the hierarchical dashboard display using a multi-dimensional dependency model operatively coupled to an application program interface (API), a hierarchical dashboard sub-window management system operatively coupled to the API, and a dashboard sub-window configuration database in communication with the hierarchical dashboard sub-window management system, wherein the hierarchical dashboard sub-window management system is operatively coupled to the hierarchical dashboard display.

7. The computer program product of claim 6 further comprising instructions for providing the hierarchical dashboard display with a multi-dimensional filter component.

8. The computer program product of claim 7 further comprising instructions for the multi-dimensional dependency model providing information for driving the hierarchical dashboard display.

9. The computer program product of claim 8 further comprising instructions for using the multi-dimensional dependency model to query related instances of a first object with a plurality of other objects in a dependency chain.

10. The computer program product of claim 9 further comprising instructions for using the multi-dimensional dependency model to query a value of attributes for the other objects in the dependency chain.

11. A hardware product comprising a non-transitory storage medium readable by a processing circuit and storing instructions for execution by the processing circuit for facilitating a method for supporting a visualization of an object model, the method comprising:

limiting one or more object instances in the object model, where multiple dependencies exist between each of the plurality of objects and filtering one or more attributes associated with one or more of the object instances, wherein the limiting and filtering is performed by:

utilizing each of a plurality of respective windows, panels, or sub-windows to display a corresponding list of one or more objects for a dimension of a plurality of dimensions, along with one or more attributes associated with each of the one or more objects;

updating at least a second window, panel, or sub-window of the plurality of respective windows, panels, or sub-windows in response to receiving a selection of an item from a first window, panel, or sub-window of the plurality of respective window, panels, or sub-windows according to a first relationship defined in the object model, wherein the updating is performed in a hierarchical manner such that at least a third window, panel, or sub-window of the plurality of respective windows, panels, or sub-windows is updated in response to receiving a selection of an item from the second window, panel, or sub-window according to a second relationship defined in the object model;

performing a filtering procedure across the plurality of dimensions to restrict one or more instances of the one or more objects to be displayed in the plurality of respective windows, panels, or sub-windows to thereby control and manage the visualization of the object model wherein the object model provides a high cardinality of objects;

displaying the first, second, and third windows, panels, or sub-windows on a hierarchical dashboard display;

providing the hierarchical dashboard display with a multi-dimensional filter component; and generating the hierarchical dashboard display using a multi-dimensional dependency model operatively coupled to an application program interface (API), a hierarchical dashboard sub-window management system operatively coupled to the API, and a dashboard sub-window configuration database in communication with the hierarchical dashboard sub-window management system, wherein the hierarchical dashboard sub-window management system is operatively coupled to the hierarchical dashboard display.

12. The hardware product of claim 11 further comprising instructions for the multi-dimensional dependency model providing information for driving the hierarchical dashboard display.

13. The hardware product of claim 12 further comprising instructions for using the multi-dimensional dependency model to query related instances of a first object with a plurality of other objects in a dependency chain.

14. The hardware product of claim 13 further comprising instructions for using the multi-dimensional dependency model to query a value of attributes for the other objects in the dependency chain.

* * * * *